United States Patent
Ban et al.

(10) Patent No.: US 7,437,925 B2
(45) Date of Patent: Oct. 21, 2008

(54) INTAKE SYSTEM HAVING A FLOW DETECTING DEVICE INCLUDING A PRESSURE RECEIVING SURFACE AT THE OUTFLOW PASSAGE OF THE BYPASS

(75) Inventors: Takao Ban, Toyohashi (JP); Noboru Kitahara, Kariya (JP); Yasushi Goka, Kariya (JP); Yasushi Kouno, Obu (JP); Gunnar Nees, Munich (DE)

(73) Assignee: Denso Corporation (JP)

( * ) Notice: Subject to any disclaimer, the term of this patent is extended or adjusted under 35 U.S.C. 154(b) by 85 days.

(21) Appl. No.: 11/521,602

(22) Filed: Sep. 15, 2006

(65) Prior Publication Data

US 2007/0056363 A1    Mar. 15, 2007

(30) Foreign Application Priority Data

Sep. 15, 2005 (JP) ............................. 2005-268311
Mar. 23, 2006 (JP) ............................. 2006-081016
Apr. 20, 2006 (JP) ............................. 2006-116778
May 31, 2006 (JP) ............................. 2006-151763

(51) Int. Cl.
*G01F 1/68* (2006.01)

(52) U.S. Cl. .................................. 73/202.5; 73/204.22
(58) Field of Classification Search ................ 73/202.5, 73/204.22
See application file for complete search history.

(56) References Cited

U.S. PATENT DOCUMENTS

| | | | | |
|---|---|---|---|---|
| 4,974,445 A | * | 12/1990 | Arai et al. ................... | 73/118.2 |
| 4,986,115 A | * | 1/1991 | Sekine et al. ............... | 73/118.1 |
| RE34,403 E | * | 10/1993 | Arai et al. ................... | 73/118.2 |
| 5,789,673 A | * | 8/1998 | Igarashi et al. ............. | 73/202.5 |
| 5,804,718 A | * | 9/1998 | Nagasaka et al. ............. | 73/202 |
| 5,939,628 A | * | 8/1999 | Igarashi et al. ................ | 73/202 |
| 6,189,379 B1 | * | 2/2001 | Igarashi et al. ................ | 73/202 |
| 6,526,822 B1 | * | 3/2003 | Maeda et al. ............. | 73/204.21 |
| 6,578,414 B2 | * | 6/2003 | Kohmura et al. .............. | 73/202 |
| 6,647,776 B2 | * | 11/2003 | Kohmura et al. ......... | 73/204.21 |

FOREIGN PATENT DOCUMENTS

JP          6-94497         4/1994
JP    2007309909 A  *  11/2007

* cited by examiner

*Primary Examiner*—Harshad Patel
(74) *Attorney, Agent, or Firm*—Nixon & Vanderhye PC (57) ABSTRACT

A flow detecting device is provided to a fluid passage through which a main flow of fluid passes. A sensor body has a bypass passage through which a bypass flow passes from the main flow. The bypass passage has a bent portion, which is located midway through the bypass passage, and an outflow passage, which is located downstream of the bent portion. The flow direction of the bypass flow changes at the bent portion toward the outflow passage through the bypass passage. A heating element is arranged in the bypass passage. The heating element generates heat by being supplied with electricity for detecting a flow amount of fluid. The sensor body has a side surface defining an opening through which dynamic pressure caused by counterflow is released to an outside of the outflow passage when fluid causes counterflow in the fluid passage in a direction opposite to a flow direction of the main flow.

7 Claims, 8 Drawing Sheets

INTAKE SYSTEM HAVING A FLOW DETECTING DEVICE INCLUDING A PRESSURE RECEIVING SURFACE AT THE OUTFLOW PASSAGE OF THE BYPASS

CROSS REFERENCE TO RELATED APPLICATIONS

This application is based on and incorporates herein by reference Japanese Patent Applications No. 2005-268311 filed on Sep. 15, 2005, No. 2006-81016 filed on Mar. 23, 2006, No. 2006-116778 filed on Apr. 20, 2006, and No. 2006-151763 filed on May 31, 2006.

FIELD OF THE INVENTION

The present invention relates to a flow detecting device. The present invention also relates to an intake system having the flow detecting device.

BACKGROUND OF THE INVENTION

Conventionally, a thermal flowmeter is applied to an automotive engine for detecting a flow amount of intake air. The thermal flowmeter detects the flow amount in accordance with heat released from a hot wire of the flowmeter, for example.

Figure 16:
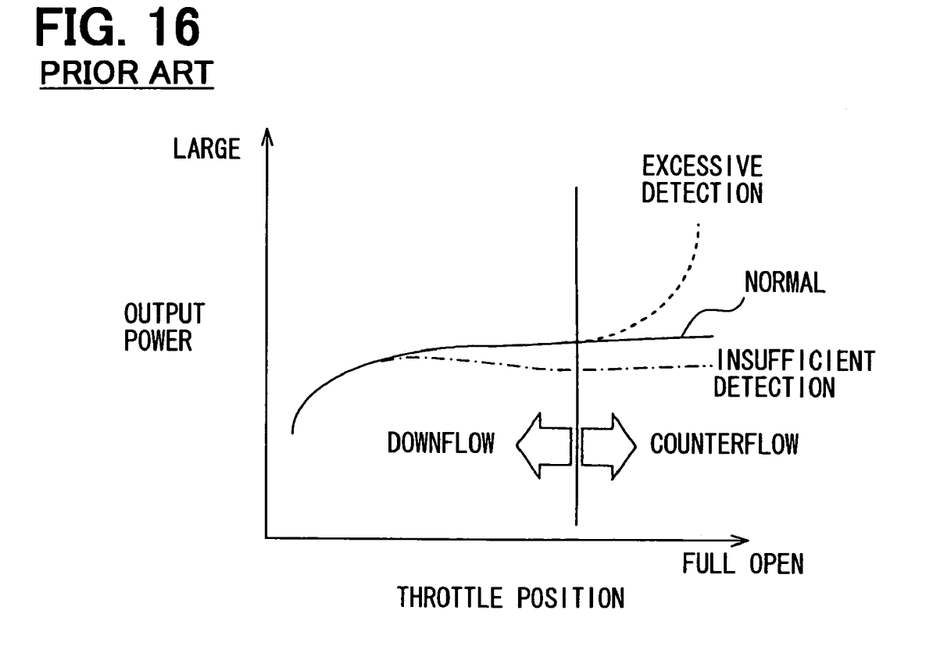
FIG. 16 is a graph showing an output characteristics of a flow detecting device according to a related art.

When an engine is operated under a high load, pulsation increases in intake air due to reciprocation of a piston in the engine. Consequently, counterflow of intake air may occur under the influence of such intake pulsation. The thermal flowmeter cannot distinguish the flow direction between the counterflow and downflow. Accordingly, the thermal flowmeter may detect the amount of counterflow as the amount of the downflow. Consequently, as shown in FIG. 16, as the operation of the engine shifts to a high load condition on the right side in FIG. 16, counterflow is caused in the airflow, and the sensor output at normal condition indicated by the solid line in FIG. 16 becomes excessive as indicated by the dotted line in FIG. 16.

Figure 17:
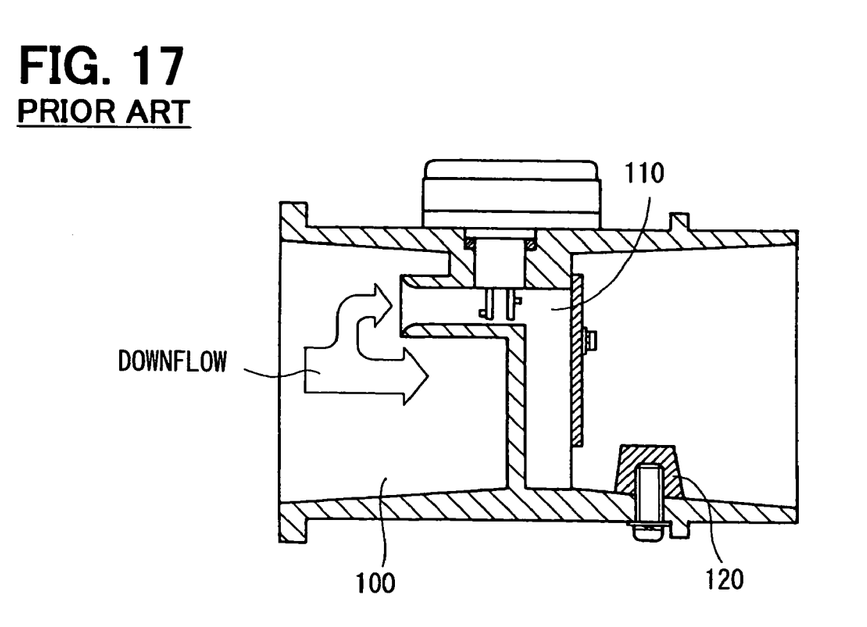
FIG. 17 is a cross sectional view showing a flow detecting device according to a prior art.

As shown in FIG. 17, JP-A-6-94497 proposes a flow detecting device that is provided with an obstacle 120 on the downstream side of an outlet of a bypass passage 110 formed in an air passage 100. The obstacle 120 is for avoiding excessive detection due to the counterflow, which is substantially opposite to the downflow indicated by the arrow in FIG. 17. In this airflow detecting device, the obstacle 120 is adapted to restricting the counterflow from entering into the bypass passage 110, so that the excessive detection can be reduced.

However, the obstacle 120 causes resistance in the airflow even in the downflow indicated by the arrow in FIG. 17. Consequently, flow velocity in the bypass passage 110 decreases, and detection of the flow amount becomes low in accuracy. In addition, the flow detecting device may become expensive due to additionally providing the obstacle 120.

Furthermore, the sensor in a thermal flowmeter has a heat capacity that causes delay in response. The amount of airflow and heat released from a heating element such as a hot wire has a relationship that presents an upwardly convex nonlinear characteristic. Accordingly, a sensor output tends to become small when pulsation increases, even when counterflow is not caused.

In recent years, intake components are integrated into a module. An integrated flowmeter is plugged in an outlet duct of an air cleaner. In this construction, it is difficult to additionally provide the obstacle 120 in the outlet duct. Accordingly, the integrated flowmeter needs to include a body having a structure for properly detecting airflow.

SUMMARY OF THE INVENTION

In view of the foregoing and other problems, it is an object of the present invention to produce a flow detecting device that is adapted to detecting fluid flow including both downflow and counterflow. It is another object of the present invention to produce an intake system for an internal combustion engine, the intake system having the flow detecting device.

According to one aspect of the present invention, a flow detecting device is provided to a fluid passage through which a main flow of fluid passes. The flow detecting device includes a sensor body that has a bypass passage through which a bypass flow passes. The bypass flow is a part of the main flow. The bypass passage has a bent portion and an outflow passage. The bent portion is located midway through the bypass passage. The outflow passage is located downstream of the bent portion. The bypass passage defines a flow direction of the bypass flow. The flow direction of the bypass flow changes at the bent portion toward the outflow passage through the bypass passage. The flow detecting device further includes a heating element that is arranged in the bypass passage. The heating element generates heat by being supplied with electricity for detecting a flow amount of fluid in accordance with an amount of heat released from the heating element. The sensor body has a side surface defining an opening. When fluid causes a counterflow in the fluid passage in a direction opposite to a flow direction of the main flow, dynamic pressure caused by the counterflow is released to an outside of the outflow passage through the opening.

According to another aspect of the present invention, a flow detecting device is provided to a fluid passage through which a main flow of fluid passes. The flow detecting device includes a sensor body that has a bypass passage through which a bypass flow passes. The bypass flow is a part of the main flow. The bypass passage has a bent portion and an outflow passage. The bent portion is located midway through the bypass passage. The outflow passage is located downstream of the bent portion. The bypass passage defines a flow direction of the bypass flow. The flow direction of the bypass flow changes at the bent portion toward the outflow passage through the bypass passage. The flow detecting device further includes a heating element that is arranged in the bypass passage. The heating element generates heat by being supplied with electricity for detecting a flow amount of fluid in accordance with an amount of heat released from the heating element. The outflow passage defines a pressure receiving surface. When fluid causes a counterflow in the fluid passage in a direction opposite to a flow direction of the main flow, dynamic pressure caused by the counterflow is applied to the pressure receiving surface. The pressure receiving surface has an obstacle that restricts the counterflow from entering into the outflow passage.

According to another aspect of the present invention, a flow detecting device is provided to a fluid passage through which a main flow of fluid passes. The flow detecting device includes a sensor body that has a bypass passage through which a bypass flow passes. The bypass flow is a part of the main flow. The bypass passage has a bent portion and an outflow passage. The bent portion is located midway through the bypass passage. The outflow passage is located downstream of the bent portion. The bypass passage defines a flow direction of the bypass flow. The flow direction of the bypass flow changes at the bent portion toward the outflow passage through the bypass passage. The flow detecting device further includes a heating element that is arranged in the bypass passage. The heating element generates heat by being supplied with electricity for detecting a flow amount of fluid in accordance with an amount of heat released from the heating element. The outflow passage defines a pressure receiving surface. When fluid causes a counterflow in the fluid passage in a direction opposite to a flow direction of the main flow, dynamic pressure caused by the counterflow is applied to the pressure receiving surface. The pressure receiving surface has a projection that projects with respect to a flow direction of the counterflow.

According to another aspect of the present invention, an intake system for an internal combustion engine includes a fluid passage through which a main flow of fluid passes. The fluid passage includes an intake passage connecting with an intake port of the internal combustion engine. The intake system further includes one of the flow detecting devices. Each flow detecting devices is provided to the fluid passage. The flow detecting device detects an amount of intake air drawn into the internal combustion engine through the intake passage.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF PREFERRED EMBODIMENTS

First Embodiment

Figure 1:
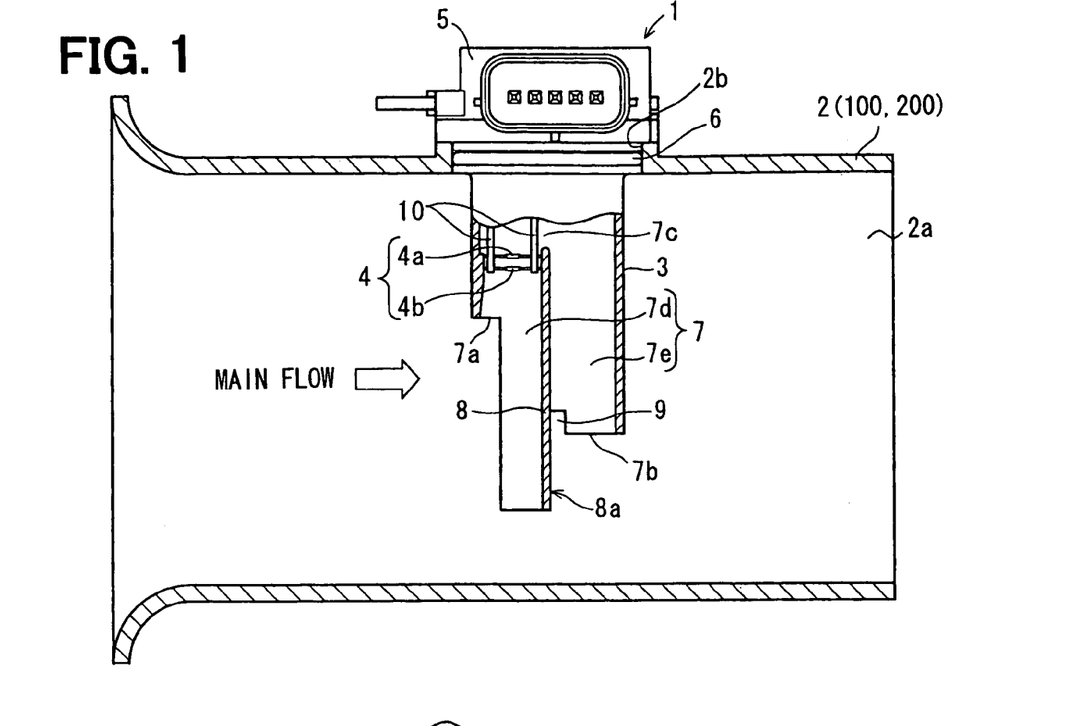
FIG. 1 is a cross sectional view showing a flow detecting device according to a first embodiment.

As shown in FIG. 1, a flow detecting device 1 is provided in an air passage 2a. The flow detecting device 1 serves as an air flowmeter for detecting an amount of intake air for an internal combustion engine such as an engine for an automobile. The flow detecting device 1 is applied to a plug-in structure. Specifically, the flow detecting device 1 is provided detachably to an outlet pipe 2 of an air cleaner 100, which defines the air passage 2a, for example. The flow detecting device 1 includes a sensor body 3, a sensing part 4, and a circuit module (control unit) 5.

The sensor body 3 is inserted into the outlet pipe 2 through a connection hole 2b formed in a wall surface of the outlet pipe 2 such that an O-ring 6 seals airtightly between the sensor body 3 and the connection hole 2b. The O-ring 6 is provided to the outer periphery of the sensor body 3.

Intake air is drawn into an internal combustion engine. The sensor body 3 has a bypass passage 7 therein. Intake air flowing through the outlet pipe 2 is partially bypassed through the bypass passage 7. The bypass passage 7 has an inlet 7a and an outlet 7b that define a U-turn portion 7c (bent portion) therebetween.

The flow direction of intake air is changed by substantially 180 degrees in the U-turn portion 7c. The sensor body 3 includes a central wall 8 that partitions an inflow passage 7d on the upstream side of the U-turn portion 7c and an outflow passage 7e on the downstream side of the U-turn portion 7c. In the following descriptions, air flowing in a direction indicated by the arrow in FIG. 1 through the outlet pipe 2 is referred to as a main flow. A part of the main flow flowing through the bypass passage 7 is referred to as a bypass flow.

Figure 2:
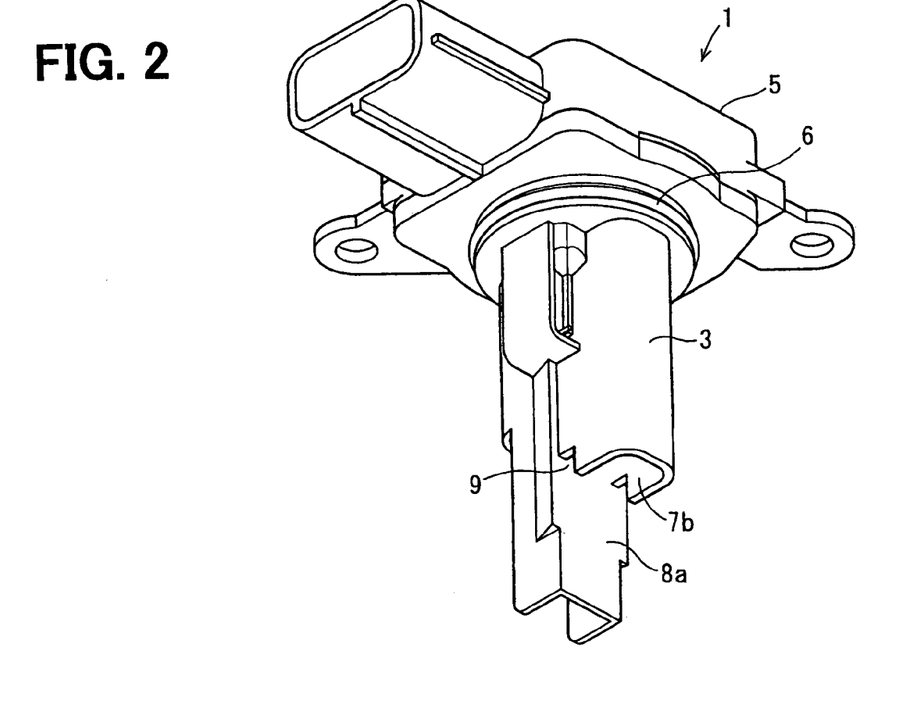
FIG. 2 is a perspective view showing the flow detecting device according to the first embodiment.

The inlet 7a of the bypass passage 7 largely opens to extend from the front surface of the sensor body 3 facing in the flow direction of the main flow to a body bottom surface toward the inflow passage 7d. The outlet 7b of the bypass passage 7 opens to the body bottom surface toward the outflow passage 7e. The level of the inlet 7a and the level of the outlet 7b are different from each other. The outlet 7b is located higher than the inlet 7a, as depicted in FIGS. 1, 2.

A slit (window) 9 is formed in a body side surface of the outflow passage 7e. When counterflow is caused in the outlet pipe 2, dynamic pressure caused by the counterflow is released outside the outflow passage 7e through the slit 9. The counterflow is substantially opposite to the main flow in direction. As referred to FIGS. 1, 2, the slit 9 is adjacent to the central wall 8. The slit 9 communicates with the outlet 7b. The slit 9 is located on the side of the outlet 7b around the body side surface. The slit (window) 9 serves as an opening.

The sensing part 4 includes a heating resistance 4a for detecting the amount of intake air flowing in the bypass passage 7 and a temperature sensing resistance 4b for detecting air temperature in the bypass passage 7. The heating resistance 4a and the temperature sensing resistance 4b connect to a circuit board (not shown), which is accommodated in the circuit module 5, via terminals 10. The sensing part 4 is arranged upstream of the U-turn portion 7c of the bypass passage 7. That is, the sensing part 4 is arranged in the inflow passage 7d.

The circuit module 5 is provided at an upper end of the sensor body 3. The circuit module 5 is located outside of the outlet pipe 2. The circuit module 5 controls an electric current flowing through the heating resistance 4a such that a difference between temperature of the heating resistance 4a and air temperature detected by the temperature sensing resistance 4b becomes constant.

Subsequently, an operation of the flow detecting device 1 is described.

When flow (main flow) of air is generated in the outlet pipe 2 upon engine start, the main flow partially flows into the bypass passage 7 of the sensor body 3. In this condition, when a bypass flow rate becomes large, heat released from the heating resistance 4a increases. Therefore, an electric current carried to the heating resistance 4a of the sensing part 4 arranged in the bypass passage 7 increases in order to maintain the temperature difference between the heating resistance 4a and air temperature detected by the temperature sensing resistance 4b constant. Conversely, when the bypass flow rate becomes small, heat released from the heating resistance 4a decreases. In this condition, an electric current carried to the heating resistance 4a decreases. An electric signal such as a voltage signal, which corresponds to the electric current carried to the heating resistance 4a, is output to an external electronic control unit (ECU) from the circuit module, so that the ECU detects the amount of intake air.

On the contrary, when counterflow is caused in the outlet pipe 2, dynamic pressure of the counterflow acts on an outlet side surface (pressure receiving surface) 8a of the central wall 8, and the dynamic pressure can be released outside the bypass passage 7 through the slit 9 formed in the body side surface. As a result, the counterflow can be restricted from passing into the bypass passage 7, so that excessive detection depicted by dotted line in FIG. 16 due to detection of counterflow can be restricted. In addition, when air flows from the inlet 7a toward the outlet 7b through the bypass passage 7 as the downflow, the slit 9 may not cause a resistance obstructing the airflow. Thus, the flow rate of the downflow may not decrease in the bypass passage 7, so that the flow rate can be stably detected.

Furthermore, excessive detection due to the counterflow can be restricted only by defining the slit 9 in the body side surface in the outflow passage 7e. Therefore, the counterflow passing through the bypass passage 7 can be inexpensively and readily suppressed. Thus, a plug-in structure can be readily provided to the outlet pipe 2 as compared with the structure in which the obstacle 120 is provided on the downstream side of the outlet of the bypass passage 110, as shown in FIG. 17. The plug-in structure is capable of suppressing intrusion of counterflow inexpensively and readily as compared with the structure shown in FIG. 17.

Second Embodiment

In the first embodiment, the slit 9 is formed on the body side around the outflow passage 7e. In this second embodiment, the relationship between a bypass length Lb of the bypass passage 7 and a slit length Ls of the slit 9, and the relationship between a bypass width Wb of the bypass passage 7 and a slit width Ws of the slit 9 are described in reference to FIG. 3.

Figure 3:
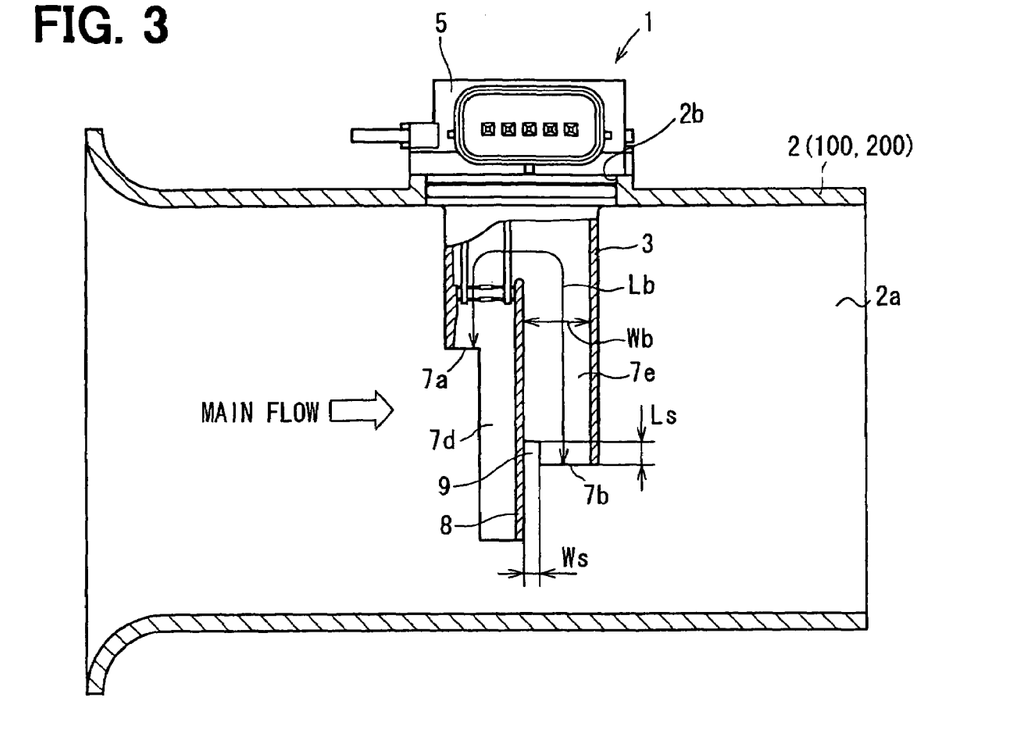
FIG. 3 is a cross sectional view showing a flow detecting device according to a second embodiment.

The bypass length Lb is the length between the inlet 7a of the bypass passage 7 and the outlet 7b of the bypass passage 7. The bypass width Wb is the width of the outflow passage 7e with respect to the flow direction of the main flow passing through the outlet pipe 2. The slit length Ls is the length along the direction of the bypass flow passing through the outflow passage 7e. The slit width Ws is the width of the slit 9 defined substantially in parallel with the bypass width Wb.

The bypass length Lb may be varied in dependence upon the definitions of the inlet 7a and the outlet 7b. The minimum distance of the bypass passage 7 between the inlet 7a and the outlet 7b may be defined as the bypass length Lb.

As described in the first embodiment, when counterflow is caused in the outlet pipe 2, the counterflow can be restricted from entering into the bypass passage 7 by releasing the dynamic pressure, which acts on the pressure receiving surface 8a, outside the bypass passage 7 through the slit 9. Accordingly, the slit length Ls and the slit width Ws need to be set appropriately relative to the bypass length Lb and the bypass width Wb in order to adequately define the slit 9.

Hereupon, the slit length Ls and the slit width Ws are prescribed relative to the bypass length Lb and the bypass width Wb in the following manner.

$$0.05 < Ls/Lb < 0.25 \qquad (1)$$

$$0.2 < Ws/Wb < 0.5 \qquad (2)$$

In the formula (1), the quotient of the slit length (opening length) Ls divided by the bypass length Lb is greater than 0.05, and is less than 0.25. In the formula (2), the quotient of the slit width (opening width) Ws divided by the bypass width (passage width) Wb is greater than 0.2, and is less than 0.5.

First, the formula (1) will be examined.

Here, the sensor output is measured in both a region, in which counterflow is caused, and in a region, in which no counterflow is caused, i.e., when the downflow is generated, respectively with the value of Ls/Lb as a parameter.

Figure 4:
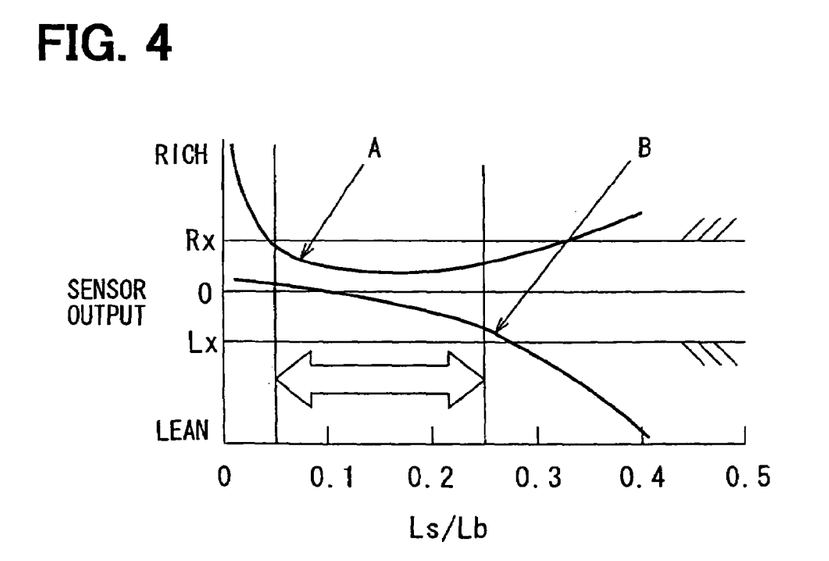
FIG. 4 is a graph showing a relationship between a sensor output and a value of Ls/Lb.

As indicated by the solid line A in FIG. 4, when counterflow is caused, the sensor output is generally shifted to the rich side. In a region, in which the value of Ls/Lb ranges from 0.05 to about 0.3, the sensor output is equal to or less than the tolerance Rx on the rich side, so that the sensor output is within the tolerance on the rich side. As indicated by the solid line A in FIG. 4, when the value of Ls/Lb becomes less than 0.05, excessive detection is caused, and the sensor output becomes excessively greater than the tolerance Rx on the rich side. It is conceivable that the slit length Ls is excessively less than the bypass length Lb in this case. Consequently, the counterflow cannot be adequately restricted from entering into the bypass passage 7, and the excessive detection is caused.

As indicated by the solid line B in FIG. 4, when the downflow is generated, the sensor output ranges between the tolerance Rx on the rich side and the tolerance Lx on the lean side in the range where the value of Ls/Lb is equal to or less than 0.25. However, as indicated by the solid line B in FIG. 4, when the value of Ls/Lb becomes greater than 0.25, the sensor output becomes less than the tolerance Lx on the lean side due to insufficient detection (see FIG. 16). In this case, it is conceivable that an adequate inertia effect is not produced by the bypass passage 7. Consequently, insufficient detection is caused when the downflow is generated.

Subsequently, the formula (2) will be examined.

The sensor output is measured with the value of Ws/Wb as a parameter in both the counterflow and the downflow.

Figure 5:
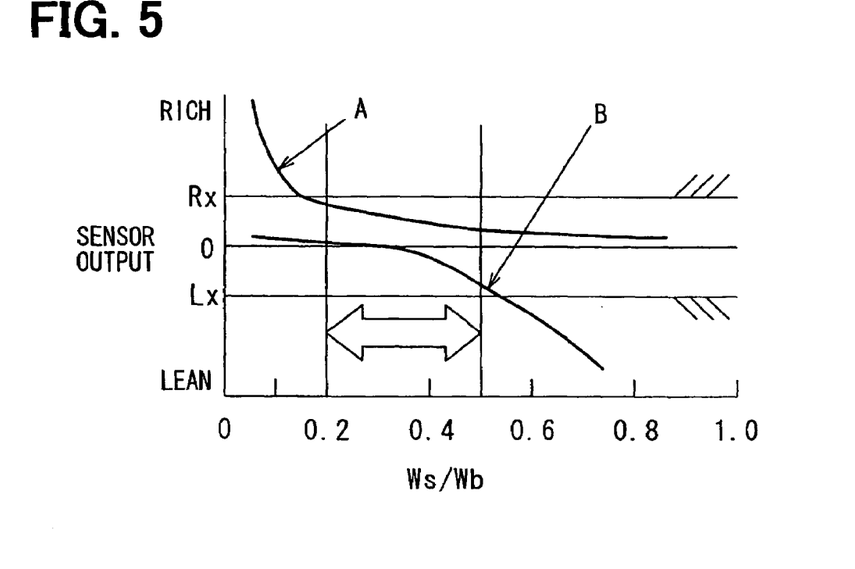
FIG. 5 is a graph showing a relationship between the sensor output and a value of Ws/Wb.

As indicated by the solid line A in FIG. 5, when the counterflow is caused, the sensor output does not become greater than the tolerance Rx on the rich side, and is within the tolerance on the rich side in the case where the value of Ws/Wb is equal to or greater than 0.2. When the value of Ws/Wb becomes less than 0.2, the counterflow cannot be adequately restricted from entering into the bypass passage 7, and excessive detection is caused. Consequently, the sensor output becomes excessively greater than the tolerance Rx on the rich side when the value of Ws/Wb becomes less than 0.2.

As indicated by the solid line B in FIG. 5, when downflow is generated, the sensor output ranges between the tolerance Rx on the rich side and the tolerance Lx on the lean side in the case where the value of Ws/Wb is equal to or less than 0.5. However, as indicated by the solid line B in FIG. 5, the sensor output becomes less than the tolerance Lx on the lean side when the value of Ws/Wb becomes greater than 0.5. In this case, it is conceivable that an adequate inertia effect is not produced by the bypass passage 7. Consequently, insufficient detection is caused in downflow when the value of Ws/Wb becomes greater than 0.5.

When a ripple factor becomes greater than 100% and the counterflow is caused, intrusion of the counterflow into the bypass passage 7 cannot be adequately suppressed when the value of Ls/Lb becomes less than 0.05 or when the value of Ws/Wb becomes less than 0.2. Consequently, excessive detection is caused, and the sensor output of the flow detecting device 1 becomes greater than the tolerance Rx on the rich side.

When the ripple factor is equal to or less than 100%, counterflow may not be caused. In this condition, an inertia effect may not be adequately produced, and the amount of intake air flowing through the bypass passage 7 at the time of pulsation may not be adequately corrected toward the rich side by inertia of the bypass passage 7. As a result, insufficient detection is caused, and the sensor output is less than the tolerance Lx on the lean side when the value of Ls/Lb becomes greater than 0.25 or when the value of Ws/Wb becomes larger than 0.5.

As seen from the results of the detection, excessive detection can be reduced in counterflow, and insufficient detection can be reduced in downflow by appropriately setting the values of the slit length Ls and the slit width Ws relative to the bypass length Lb and the bypass width Wb by meeting the relationships of the formula (1) and the formula (2), for example. Thus, the sensor output can be maintained between the tolerance Rx on the rich side and the tolerance Lx on the lean side. As a result, output error can be decreased, so that accuracy of the flow detecting device 1 can be enhanced.

Third Embodiment

Figure 6:
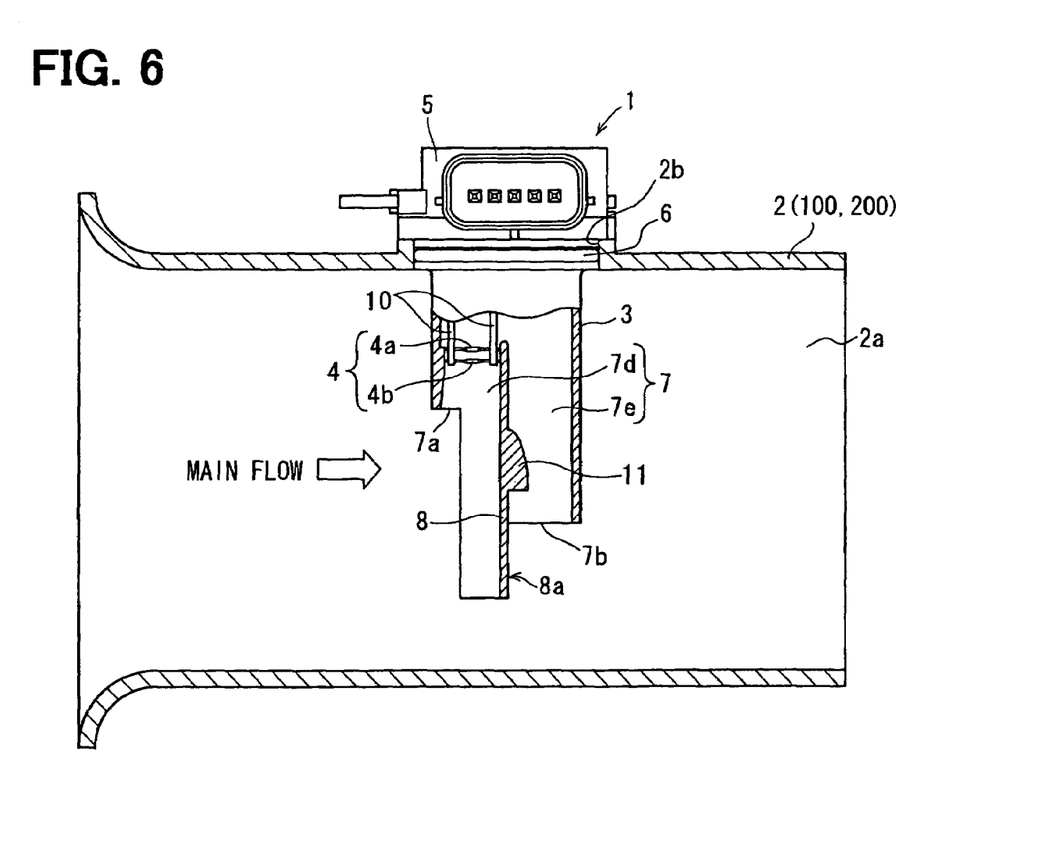
FIG. 6 is a cross sectional view showing a flow detecting device according to a third embodiment.

As referred to FIG. 6, the third embodiment describes an example, in which an obstacle 11 is provided on the pressure receiving surface 8a of the central wall 8. The central wall 8 partitions the inflow passage 7d from the outflow passage 7e. The obstacle 11 serves as a counterflow inhibiting unit.

The obstacle 11 is provided to the outlet 7b of the central wall 8 in the outflow passage 7e. The obstacle 11 is protruded from the central wall 8. The obstacle 11 has the height that gradually increases from the upstream of the outflow passage 7e toward the downstream of the outflow passage 7e. The height of the obstacle 11 gradually increases from the upward to the downward in FIG. 6.

The obstacle 11 provided on the central wall 8 serves as resistance to dynamic pressure, so that the obstacle 11 is adapted to suppressing intrusion of the counterflow in the case where the counterflow is caused in the outlet pipe 2 and dynamic pressure of the counterflow is applied to the pressure receiving surface 8a of the central wall 8. Thus, excessive detection can be restricted when the counterflow is caused.

In addition, when the downflow passes from the inlet 7a toward the outlet 7b in the bypass passage 7, the air flows in the direction, in which the obstacle 11 increases in height, so that the downflow is not excessively obstructed by the obstacle 11 but can readily get over the obstacle 11. As a result, the flow rate of the downflow does not excessively decrease in the bypass passage 7, so that flow detection can be steadily conducted.

Further, it is not necessary to provide any obstacle, such as the obstacle 120 in FIG. 17, in the outlet pipe 2 similarly to the first embodiment, so that the structure of the flow detecting device 1 can be applied to the a plug-in structure adapted to be attached into the outlet pipe 2, for example. The plug-in structure is capable of suppressing intrusion of counterflow inexpensively and readily as compared with the structure shown in FIG. 17.

Fourth Embodiment

Figure 7:
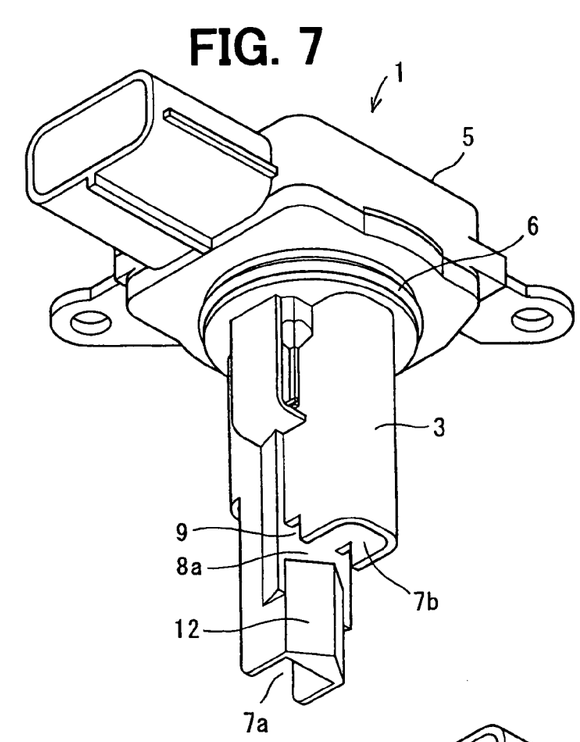
FIG. 7 is a perspective view showing a flow detecting device according to a fourth embodiment.

FIG. 7 is a perspective view showing a flow detecting device 1 according to the fourth embodiment. In this example, a projection 12 is provided on the pressure receiving surface 8a of the central wall 8. The projection 12 serves as the counterflow inhibiting unit. The projection 12 is provided on the pressure receiving surface 8a, on which dynamic pressure is directly applied to the central wall 8. The projection 12 extends from the outlet 7b of the bypass passage 7 downwardly in FIG. 7. The projection 12 projects in a triangular-shaped manner from both sides of the pressure receiving surface 8a with respect to the direction of counterflow.

In such construction, when the counterflow is caused in the outlet pipe 2, dynamic pressure of the counterflow can be released outside the outflow passage 7e along both sloping surfaces of the projection 12 provided on the pressure receiving surface 8a of the central wall 8. Therefore, the counterflow can be restricted from intruding into the bypass passage 7. As a result, it is possible to restrict excessive detection when the counterflow is caused. Thus, reliability and accuracy of the flow detecting device 1 can be enhanced.

Figure 8:
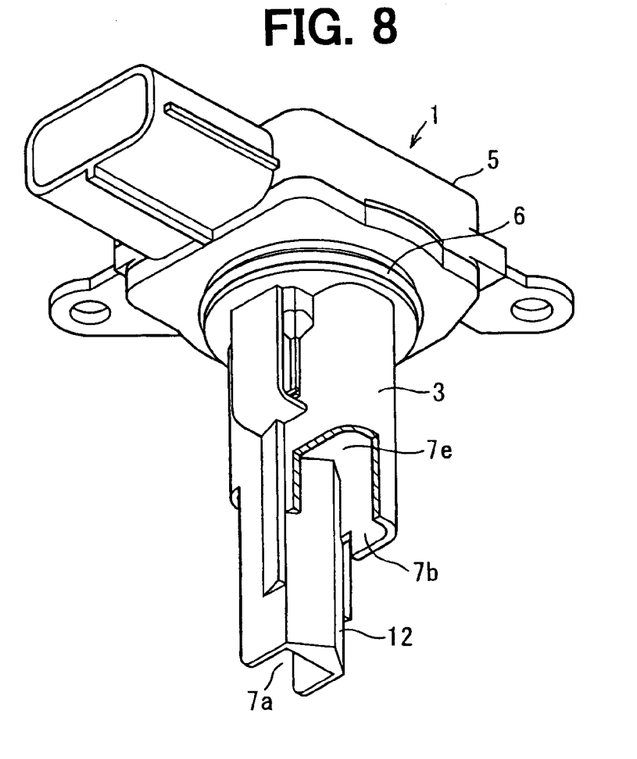
FIG. 8 is a partially perspective sectional view showing the flow detecting device according to the fourth embodiment.
Figure 9:
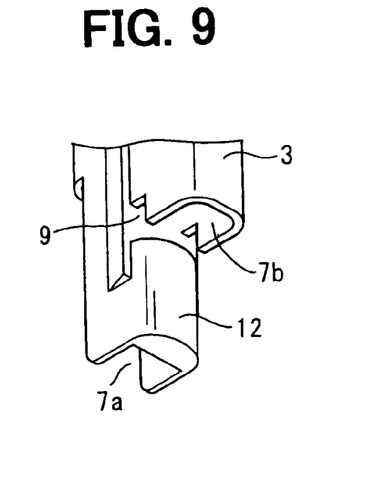
FIG. 9 is a perspective view showing an example of a projection according to the fourth embodiment.
Figure 10:
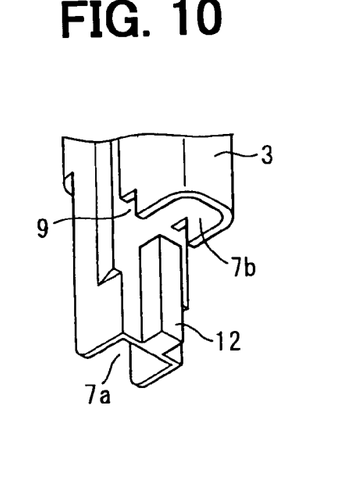
FIG. 10 is a perspective view showing another example of a projection according to the fourth embodiment.

The projection 12 is not limited to be provided to the region downward of the outlet 7b in the bypass passage 7. As shown in FIG. 8, the projection 12 may be provided on the pressure receiving surface 8a of the central wall 8 to extend into the outflow passage 7e. The projection 12 is not limited to be triangular-shaped in cross section as referred to FIG. 7. As shown in FIG. 9, the projection 12 may be arcuate-shaped in cross section. Alternatively, as shown in FIG. 10, the projection 12 may be convex-shaped in cross section.

Fifth Embodiment

In this example, a modified shape of the projection 12 in fourth embodiment is described.

Figure 11:
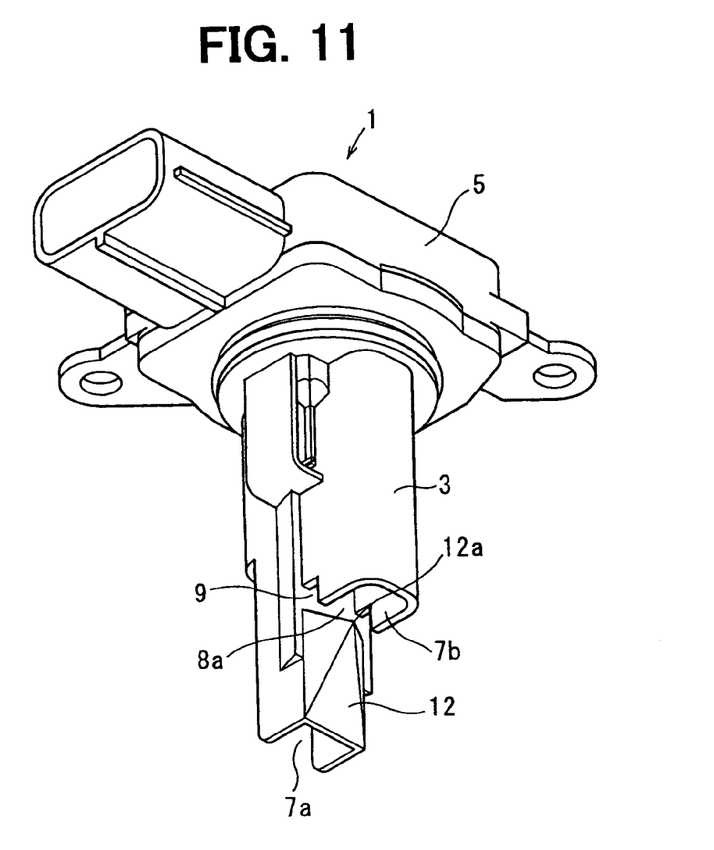
FIG. 11 is a perspective view showing a flow detecting device according to a fifth embodiment.

As shown in FIG. 11, the projection 12 is provided in the form of a substantially pyramid having an apex 12a with respect to the width direction and the length direction of the pressure receiving surface 8a. The length direction of the projection 12 corresponds to the vertical direction in FIG. 11.

Figure 12:
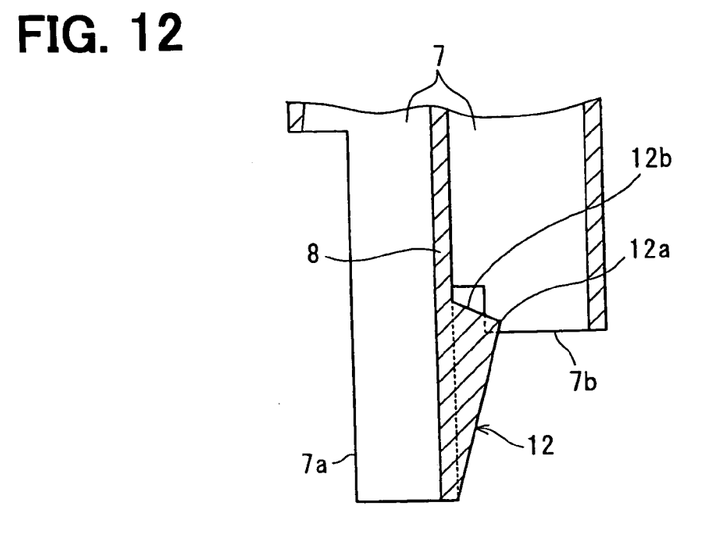
FIG. 12 is a cross sectional view showing a projection of the flow detecting device according to the fifth embodiment.
Figure 13:
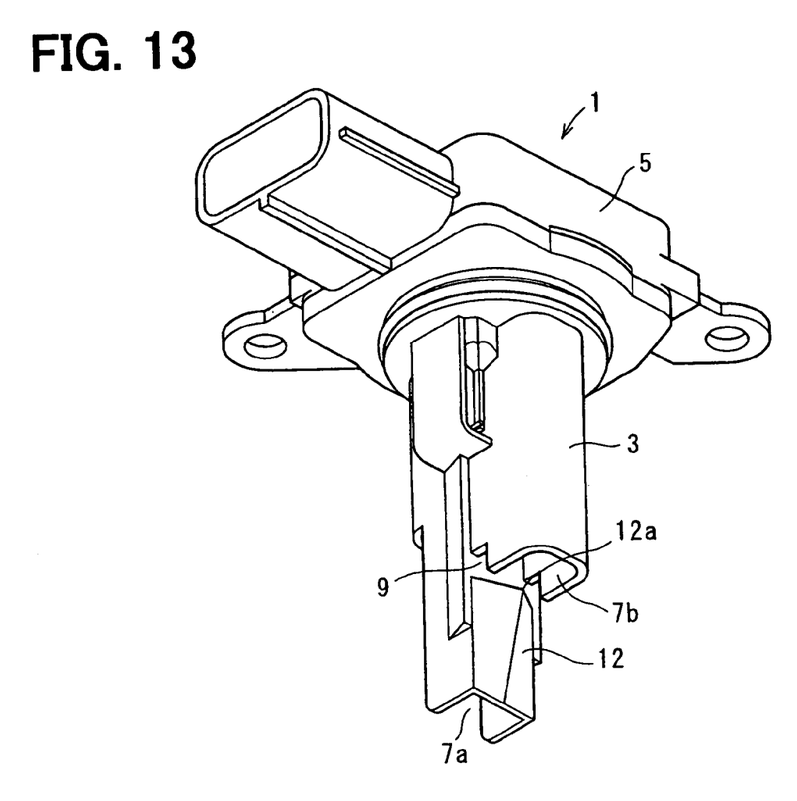
FIG. 13 is a perspective view showing the projection of the flow detecting device according to the fifth embodiment.

In addition, as shown in FIG. 12, the apex 12a of the projection 12 may be provided upstream of the outlet 7b and may be partially located in the bypass passage 7.

With such construction, even when counterflow is caused in the outlet pipe 2, the counterflow can be released outside along the surfaces, on which dynamic pressure of the counterflow is applied. That is, the respective sloping surfaces of the projection 12 projecting outside the outlet 7b of the bypass passage 7 are inclined in directions, in which dynamic pressure of the counterflow is released outside. The surfaces of the projection 12 are inclined oppositely to the direction, in which dynamic pressure of the counterflow applies into the bypass passage 7, so that the counterflow can be effectively restricted from entering into the bypass passage 7. As a result, excessive detection can be restricted when the counterflow is caused. Thus, reliability and accuracy of the flow detecting device 1 can be enhanced.

In addition, the projection 12 is provided in the form of the substantially pyramid having the apex 12a with respect to the width direction and the length direction of the pressure receiving surface 8a. That is, the sloping surface 12b (FIG. 12) is inclined upstream of the bypass passage 7 from the apex 12a, so that the airflow passing from the inlet 7a toward the outlet 7b in the bypass passage 7 is not excessively obstructed by the projection 12 but can readily get over the projection 12. As a result, the flow rate does not excessively decrease in the bypass passage 7, so that flow detection can be stably conducted.

Figure 14:
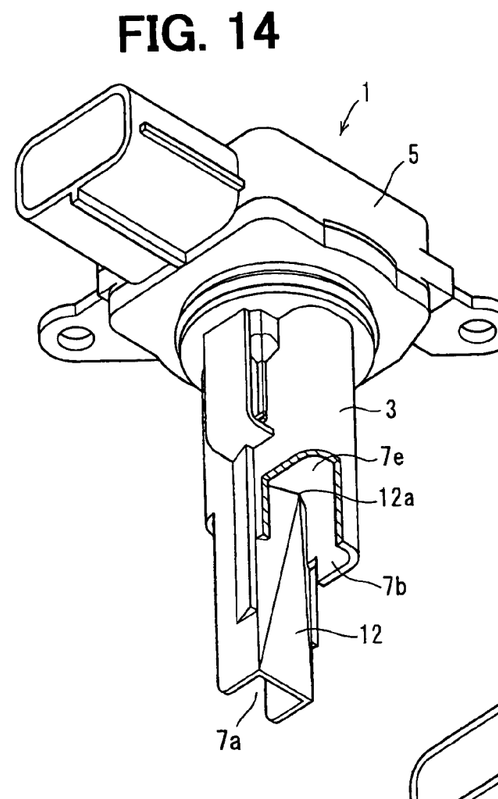
FIG. 14 is a partially sectional perspective view showing the flow detecting device according to the fifth embodiment.
Figure 15:
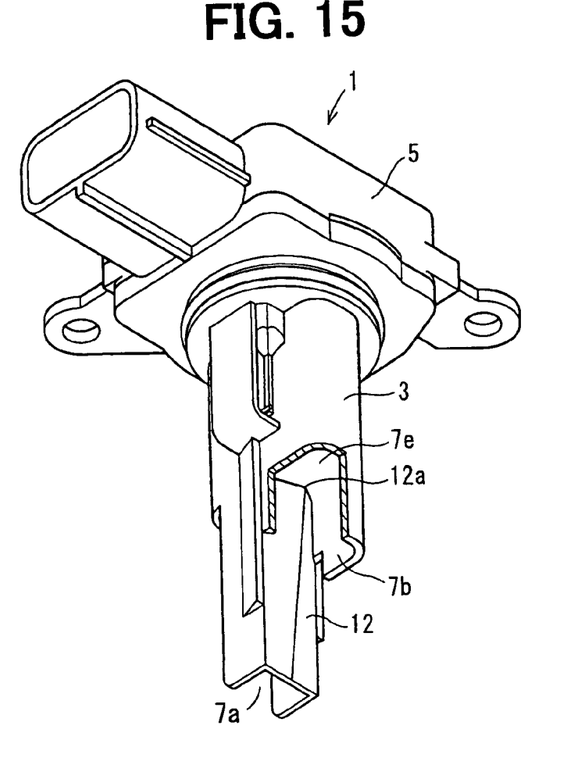
FIG. 15 is a partially sectional perspective view showing a projection of the flow detecting device according to the fifth embodiment.

As referred to FIG. 11, the projection 12 is shaped to have the ridgelines directed from the apex 12a toward both the corners at tip ends of the pressure receiving surface 8a. Alternatively, the projection 12 may be shaped to have the ridgelines directed from the apex 12a of the projection 12 toward a substantially center between the tip ends of the pressure receiving surface 8a. In addition, as shown in FIGS. 14, 15, the projection 12 may extend into the outflow passage 7e.

(Modifications)

The above structures of the embodiments can be combined as appropriate. For example, the slit 9 (window, opening) according to the first and second embodiments may be combined with the flow detecting device 1 according to the third to fifth embodiments. Thereby, the slit 9 can release dynamic pressure of the counterflow outside the outflow passage 7e in addition to the effects of the obstacle 11 or the projection 12 provided on the pressure receiving surface 8a. Thus, intrusion of the counterflow into the bypass passage 7 can be further effectively suppressed.

The slit 9 (window) is not limited to the shape in the first and second embodiments. The slit 9 (window) may be various opening in various shapes, as long as the slit 9 (window, opening) is capable of releasing the dynamic pressure of the counterflow.

The air cleaner 100 provided with the flow detecting device 1 may include a filter device to remove foreign matters contained in the intake air. The flow detecting device 1 is not limited to be applied to the outlet pipe 2 of the air cleaner 100. The flow detecting device 1 may be provided to a throttle body 200, for example. The throttle body 200 may construct a throttle device adapted to controlling the amount of intake air flowing into the engine.

The fluid detected by the flow detecting device 1 is not limited to intake air. The flow detecting device 1 may be applied to detect any other fluid flow causing both downflow and counterflow.

Various modifications and alternations may be diversely made to the above embodiments without departing from the spirit of the present invention.

What is claimed is:

1. A flow detecting device that is provided to a fluid passage through which a main flow of fluid passes, the flow detecting device comprising:
 a sensor body that has a bypass passage through which a bypass flow passes, the bypass flow being a part of the main flow, the bypass passage having a bent portion and an outflow passage, the bent portion being located midway through the bypass passage, the outflow passage being located downstream of the bent portion, the bypass passage defining a flow direction of the bypass flow, the flow direction of the bypass flow changing at the bent portion toward the outflow passage through the bypass passage; and
 a heating element that is arranged in the bypass passage, the heating element generating heat by being supplied with electricity for detecting a flow amount of fluid in accordance with an amount of heat released from the heating element,
 wherein the sensor body has a side surface parallel to the main flow and a lateral opening, such that when fluid causes a counterflow in the fluid passage in a direction opposite to a flow direction of the main flow, dynamic pressure caused by the counterflow is released to an outside of the outflow passage through the opening, and
 the outflow passage communicates with an outside of the sensor body through the opening of the side surface.

2. The flow detecting device according to claim 1,
 wherein the outflow passage has a pressure receiving surface, on which the dynamic pressure of the counterflow is applied, and
 the opening is adjacent to the pressure receiving surface.

3. The flow detecting device according to claim 1,
 wherein the bypass passage has an inlet and an outlet, which are distant from each other for a bypass length along the flow direction of the bypass flow,
 the opening has an opening length along the flow direction of the bypass flow,
 a quotient of the opening length divided by the bypass length is greater than 0.05, and
 the quotient of the opening length divided by the bypass length is less than 0.25.

4. The flow detecting device according to claim 1,
 wherein the outflow passage has a passage width along the flow direction of the main flow,
 the opening has an opening width along the flow direction of the main flow,
 a quotient of the opening width divided by the passage width is greater than 0.2, and
 the quotient of the opening width divided by the passage width is less than 0.5.

5. An intake system for an internal combustion engine, the intake system comprising:
 a pipe that defines a fluid passage through which a main flow of fluid passes, the fluid passage including an intake passage connecting with an intake port of the internal combustion engine;
 a flow detecting device that is provided to the fluid passage, the flow detecting device detecting an amount of intake air drawn into the internal combustion engine through the intake passage,
 wherein the flow detecting device includes:
 a sensor body that has a bypass passage through which a bypass flow passes, the bypass flow being a part of the main flow, the bypass passage having a bent portion and an outflow passage, the bent portion being located midway through the bypass passage, the outflow passage being located downstream of the bent portion, the bypass passage defining a flow direction of the bypass flow, the flow direction of the bypass flow changing at the bent portion toward the outflow passage through the bypass passage; and
 a heating element that is arranged in the bypass passage, the heating element generating heat by being supplied with electricity for detecting a flow amount of fluid in accordance with an amount of heat released from the heating element,
 wherein the sensor body has a side surface parallel to the main flow and a lateral opening, such that when fluid causes a counterflow in the fluid passage in a direction opposite to a flow direction of the main flow, dynamic pressure caused by the counterflow is released to an outside of the outflow passage through the opening, and the outflow passage communicates with an outside of the sensor body through the opening of the side surface.

6. The intake system according to claim 5, further comprising:
- an air cleaner that includes the pipe having a wall surface defining a connection hole, the pipe at least partially defining the intake passage,
- wherein the flow detecting device and the pipe constructing a plug-in structure, in which the flow detecting device is attachable to and detachable from the pipe through the connection hole.

7. The intake system according to claim 5, further comprising:
- a throttle device that includes a throttle body, the throttle body including the pipe having a wall surface defining a connection hole, the pipe at least partially defining the intake passage,
- wherein the flow detecting device and the pipe constructing a plug-in structure, in which the flow detecting device is attachable to and detachable from the pipe through the connection hole.

* * * * *